United States Patent [19]
Wright

[11] 3,945,261
[45] Mar. 23, 1976

[54] ABUTMENT ASSEMBLY FOR SHOE DRUM BRAKES

[75] Inventor: Andrew Charles Walden Wright, Birmingham, England

[73] Assignee: Girling Limited, Birmingham, England

[22] Filed: Aug. 29, 1974

[21] Appl. No.: 501,295

[30] Foreign Application Priority Data
Aug. 29, 1973 United Kingdom............ 40702/73

[52] U.S. Cl. .................... 74/110; 74/516; 188/331
[51] Int. Cl.² .................................... F16H 21/44
[58] Field of Search ........... 188/325, 331, 332, 341; 74/110, 516; 92/84, 129; 60/570, 590

[56] References Cited
UNITED STATES PATENTS

| | | |
|---|---|---|
| 2,246,242 | 6/1941 | Chase .................................. 188/331 |
| 3,042,289 | 7/1962 | Mikina................................ 92/84 X |
| 3,805,926 | 4/1974 | Clay et al...................... 188/331 X |

Primary Examiner—George E. A. Halvosa
Attorney, Agent, or Firm—Scrivener Parker Scrivener and Clarke

[57] ABSTRACT

An abutment assembly for an internal shoe drum brake, particularly a vehicle wheel brake, comprising a pair of opposed abutment members for engagement with respective ends of the brake shoes and an arrangement for transmitting only part of the input force applied to one abutment member, to the other abutment member. The arrangement comprises a plurality of individual force-transmitting members each pivotally supported between and engaging the said one abutment member and an output member coupled to the other abutment member.

2 Claims, 1 Drawing Figure

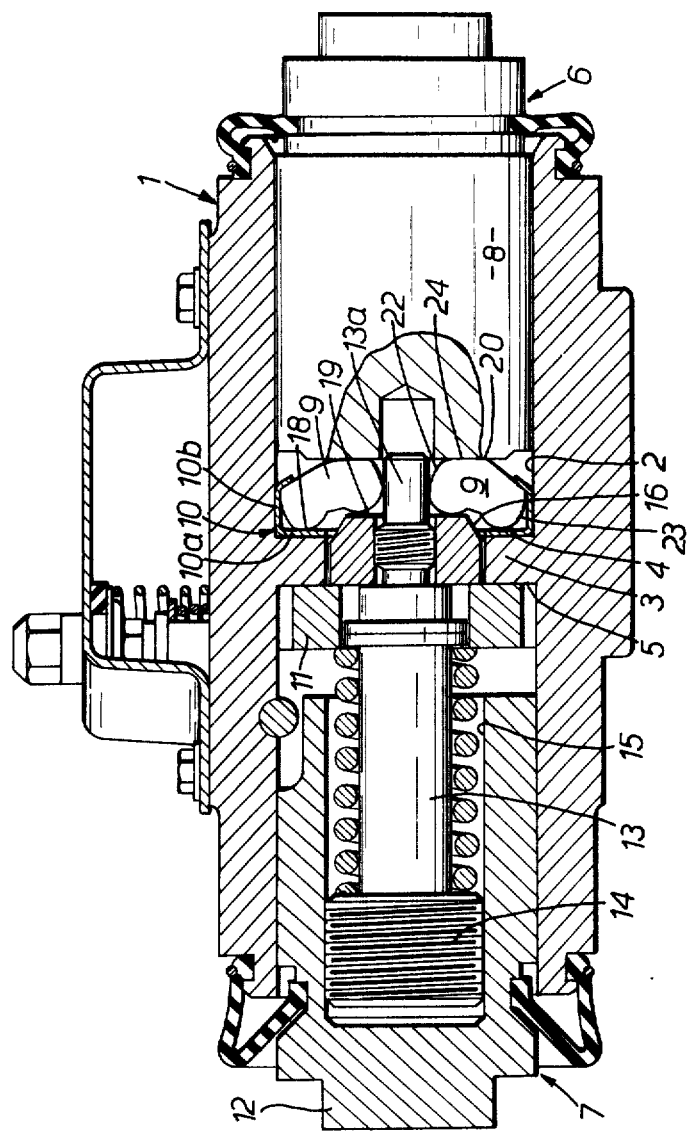

ABUTMENT ASSEMBLY FOR SHOE DRUM BRAKES

This invention relates to abutment assemblies for internal shoes drum brakes of the two leading shoe type.

The abutment load on the trailing edge of the primary shoe cannot be used directly to actuate the other shoe, as the servo-effect created by the rotation of the wheel would result in the secondary shoe being applied with greater force than is desirable causing, for example, erratic braking and brake fade. Thus, the abutment load transmitted from one shoe to the other is normally reduced.

In a previously proposed abutment assembly the abutment force is transmitted through a single large pivoted lever which introduces a lever ratio, and thus a mechanical disadvantage, between the adjacent shoe ends.

In accordance with the present invention, there is provided an abutment assembly for an internal shoe drum brake, comprising first and second abutment means for engagement with adjacent ends of respective brake shoes, and force-transmitting means for transmitting forces between the abutment means, wherein said force-transmitting means comprises a plurality of force-transmitting members each being pivotally supported between and engaging the first abutment means and an output member in thrust-transmitting relation with the second abutment means, each force-transmitting member being so orientated that only part of the input force applied to the first abutment means is transmitted by the force-transmitting members to the output member.

With this arrangement, it becomes possible to secure the following advantages over abutment assemblies having a single, large pivoted lever arrangement: side loading and friction losses are reduced; load bearing contact areas are co-axial; the problems arising from stress concentrations in a single pivot pin are avoided; and the axial length of the strut can be reduced.

An abutment assembly in accordance with the invention for an internal shoe vehicle drum brake of the two leading shoe type will now be described, by way of example, with reference to the accompanying drawing which shows an axial cross-section of the abutment assembly.

The abutment assembly is, in use, fastened to the brake back plate (not shown) between adjacent ends of a pair of brake shoes (not shown) of the drum brake, a double ended hydraulic actuator (not shown) being positioned between the other two ends of the shoes.

The abutment assembly comprises a housing 1 having a through bore 2 and an internal annular shoulder 3 intermediate the ends of the bore, the shoulder 3 having opposed abutment surfaces 4 and 5. Tappet assemblies 6 and 7 are housed within the bore 2, one on each side of the shoulder 3.

The right hand tappet assembly 6 comprises an abutment member 8 and a plurality of identical force-transmitting finger members 9. The radially outer end of each finger member 9 is received in an annular cage 10 one part 10a of which seats against the abutment surface 4 and another part 10b of which seats against the adjacent internal surface of housing 1.

The left hand tappet assembly 7 comprises an abutment member 12 slidable in the bore 2 and a spindle 13 having a head 14 screw-threadedly connected in a blind bore 15 in the abutment member 12. The spindle 13 extends through a gear 11, the spindle and gear being keyed together so that they can move axially but not rotatably relative to each other, and through an annular collar 16 which abuts a shoulder on the spindle 13 and the finger members 9. The gear 11 forms part of an adjuster mechanism. The end 13a of the spindle is of reduced diameter and is receivable in a bore in the inner end of the abutment member 8. The spindle 13 provides a support for the finger members 9, as will be hereinafter described.

Each of the finger members 9 has a pair of spaced curved surfaces 18, 19 which bear respectively against part 10a of the cage 10 and against the collar 16, which constitutes an output member. A further curved surface 20 engages the right hand abutment member 8 in the operative condition of the abutment assembly. The radially inner and outer ends of each finger member are preferably curved as at 22, 23, to form arcs of the same circle, these ends 22, 23 engaging the end 13a of the spindle 13 and the cage 10, respectively, so that each finger member is closely restrained and supported. The finger members are advantageously symmetrically arranged around the spindle 13 and preferably there are eight arranged circumferentially around the spindle end 13a, with sufficient angular clearance that as their positions change during operation the fingers do not jam.

In operation, when the brake is applied while the brake drum is rotating in a forward direction (clockwise as seen in the drawing) a servo abutment force is applied to the abutment member 8 by its adjacent shoe end. The abutment member 8 moves to the left causing each finger member to pivot about its spaced curved surfaces 18, 19 and transmit a reduced force through the collar 16 and spindle 13 to the left hand abutment member 12. The force reduction will depend upon the spacing between the points of contact of the curved surfaces 18, 19 with the part 10a of cage 10 and the collar 16, respectively, and the position of the application of the force to the finger members by the abutment member 8.

In the inoperative condition of the abutment assembly shown in the drawing, the abutment member 8 engages flat surfaces 24 on the finger members 9. However, when the abutment member 8 moves to the left these flat surfaces 24 tend to move away from the abutment member as the finger members pivot and the adjacent curved surfaces 20 engage the abutment member 8.

When the brake is released the abutment assembly is returned to its inoperative condition shown under the action of brake shoe return springs (not shown).

If the brake is applied when the drum is rotating in the reverse direction, the abutment force on the left hand abutment member 12 is transmitted through the spindle and the collar 16 to the radially inner ends 19 of the finger members. Since the finger members are prevented from pivoting by the engagement of the flat surfaces 22 with the abutment member 8, the full abutment force is transmitted to the abutment member 8 to give a full duo-serve effect.

Of course, an abutment force reduction could be achieved in the reverse direction of rotation by suitably modifying the left hand tappet assembly 7 in a manner similar to the right hand tappet assembly 6.

Although the above described abutment assembly utilises curved surfaces on the finger members as fulcrum surfaces, it would be possible to modify the abutment assembly to utilise fixed pivots. However, the above described assembly has the advantage that the finger members with all the curved surfaces formed thereon, can be economically mass produced, for example by extrusion.

The above described abutment assembly also provides a more balanced force transmission than known arrangements and makes effective use of space by using a plurality of small force-transmitting members 9 acting as levers.

I claim:

1. An abutment assembly for a shoe drum brake comprising a fixed housing having a through bore, first and second abutment members slidably received in said bore and having opposed inner ends and exposed outer ends for engagement with adjacent ends of respective brake shoes, a fixed annular shoulder in said bore between the inner ends of said abutment members, an axially extending output member carried by said second abutment member and having an annular shoulder coaxial with but of smaller diameter than said fixed annular shoulder, both of said shoulders facing in axially spaced relationship the inner end of said first abutment member, an axially extending cylindrical spindle on said output member extending from the shoulder thereof towards the inner end of said first member, and a plurality of radially extending force transmitting members arranged symmetrically around the axes of said abutment members and having flat side faces normal to said shoulders and having curved surfaces on their inner and outer ends, an annular cage engaging said fixed shoulder and said bore and pivotally receiving the outer ends of said force transmitting members, the inner ends of said members engaging the cylindrical surface of said spindle, each of said members also having on its inner side a pair of radially spaced curved parts respectively engaging the part of said cage which engages said fixed shoulder in said bore and the movable shoulder on said output member and having on its outer side a surface of which the radially inner portion is flat and normally in engagement with the inner end of said first abutment member so that said force transmitting means is prevented by said flat portion from pivoting whereby a force applied to said second abutment member is transmitted through said output member and said force transmitting member to said first abutment member substantially unchanged, a radially outer portion of the outer side of each force transmitting member adjacent said flat portion being curved to permit pivoting of said force transmitting member on the inner end of said first abutment member whereby said force transmitting members are constructed and arranged to provide a lever ratio as they fulcrum about that part of the cage engaging said fixed shoulder to transmit from said first abutment member through said output member to said second abutment member only a part of the force applied to said first abutment member.

2. An abutment assembly according to claim 1 wherein the curved inner and outer end surfaces are sectors of a common circle.

* * * * *